C. W. CRAWFORD.
SHOCK ABSORBER.
APPLICATION FILED NOV. 13, 1912.

1,075,901. Patented Oct. 14, 1913.

Witnesses.
Frank Waterfield

Inventor.
Cary W. Crawford.
by
Attorney.

UNITED STATES PATENT OFFICE.

CARY W. CRAWFORD, OF LOS ANGELES, CALIFORNIA.

SHOCK-ABSORBER.

1,075,901.

Specification of Letters Patent.  Patented Oct. 14, 1913.

Application filed November 13, 1912. Serial No. 731,126.

*To all whom it may concern:*

Be it known that I, CARY W. CRAWFORD, a citizen of the United States, residing at the city of Los Angeles, county of Los Angeles, and State of California, have invented new and useful Improvements in Shock-Absorbers, of which the following is a specification.

My invention relates primarily to a shock absorber for that class of wheeled vehicles in which the load carrying body is carried by the running gear, and the object is to prevent an objectionable recoil when such vehicle passes over an obstruction or into a rut.

A further object is to reduce the friction on the moving parts to a minimum.

Figure 1:
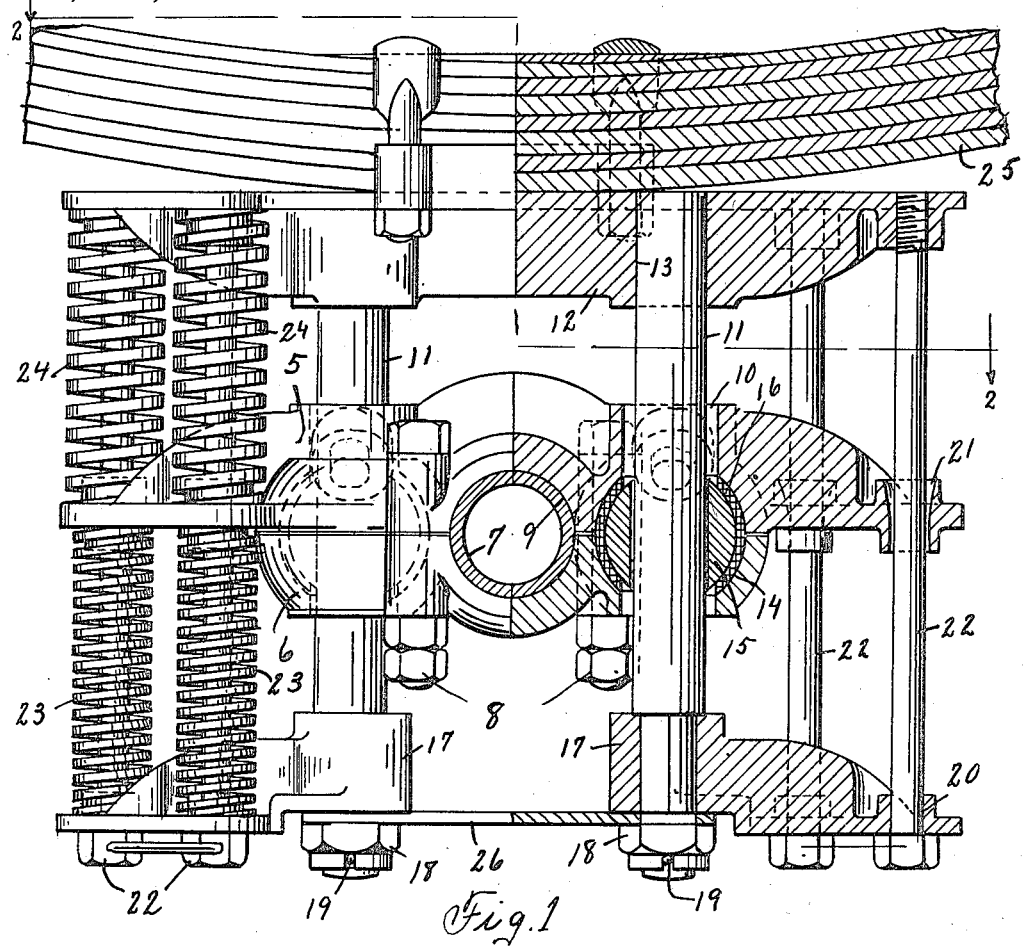
Figure 2:
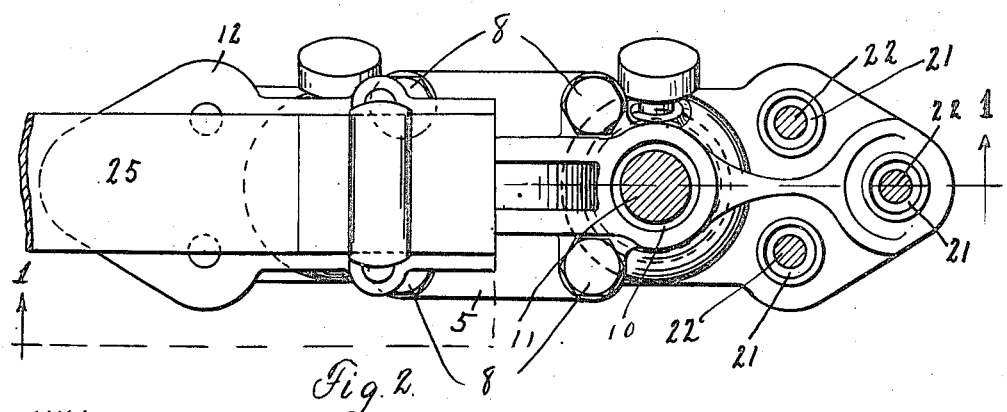

I accomplish these objects by the device described herein and illustrated in the accompanying drawings forming a part hereof in which:

Figure 1 is a side view partly in vertical section and partly in elevation of my improved shock absorber, on the line 1—1 Fig. 2. Fig. 2 is a top plan view partly in section of my improved shock absorber taken on the line 2—2 of Fig. 1.

In the drawings the axle frame is composed of an upper section 5 and a lower section 6 which are secured upon the axle 7 of the automobile or other vehicle by bolts 8, an axle receiving recess 9 being provided in the portion of the frame that surrounds the axle. At each side of the axle the frame is provided with vertical apertures 10 through which pass the guide rods 11, the upper ends of which are forced into the crown plates 12 in holes 13 provided therein. Apertures 10 are a little larger than guide rods 11 so that the rods can move angularly to the frame within reasonable limits. The central portions of apertures 10 are enlarged and form bearing recesses or sockets 14 whose inner surfaces are in shape preferably segments of a globe. Within sockets 14 are bearing balls 15 which are pierced for the passage therethrough of guide rods 11 which pass therethrough with a working fit. These balls are preferably of bronze. The sockets 14 may be machined. If not machined a Babbitt metal lining 16 is provided to make a perfect fit between the balls and the axle frame. The lining is suitably anchored in the frame so as to turn with and not in it. The lower ends of the guide rods 11 are reduced for the reception of shoes 17 which are held thereon by castle nuts 18 which when positioned are held against rotation by pins 19 which are passed through holes in the ends of the guide rods. Shoes 17 have holes 20 extending therethrough which register with holes 21 extending through the top plate of the axle frame. Bolts 22 pass through shoes 17 and through the top plate of the axle frame and screw into the crown plate. These bolts have holes drilled through their heads through which is passed a U-shaped wire to prevent the accidental unscrewing of the bolts after they are in place. Between these shoes and the axle frame and surrounding bolts 22 are the rebound springs 23 which are positioned under compression. Between the axle frame and the crown plate and surrounding bolts 22 are the shock or weight carrying springs 24 which are positioned under compression. The crown plate is secured to springs 25. The shoes 17 are connected by bar 26 which may be separate or integral. The ends of the springs may be held positioned by bosses or cups as desired. By this construction the body of the vehicle is carried practically level while the wheels conform to the unevenness of the ground or track. If desired the ordinary vehicle springs can be dispensed with and the crown plate secured directly to the body of the vehicle. The guide rods may be of any shape in cross section but I prefer round rods.

Having described my invention what I claim is:

1. A shock absorber comprising an axle frame having a plurality of vertical openings extending therethrough when positioned for use and having segmental spherical chambers therein at the sides of the axle when positioned for use; segmental pierced bearing balls in said chambers; a crown plate adapted to be secured to the body of the vehicle; guide rods secured in the crown plate and passing through holes in the axle frame, said bolts being of less diameter than the holes and also passing through the balls with a working fit; shoes having vertical holes extending therethrough secured upon the lower ends of the guide rods; bolts passing through the holes in the shoes and axle frame and into and secured to the crown plate; and rebound and shock springs secured upon said last bolts.

2. In a shock absorber the combination of an axle frame adapted to be secured upon the axle and having guiding holes extending therethrough and globular socket therein; pierced balls in said sockets; means secured to the body of the vehicle having guiding bolts and spring bolts secured thereto passing through the holes in the axle frame, said guiding bolts passing through the balls in the sockets in the axle frame; and shock and rebound springs on the spring bolts.

In witness that I claim the foregoing I have hereunto subscribed my name this 6th day of November, 1912.

CARY W. CRAWFORD.

Witnesses:
G. E. HARPHAM,
FRANK WATERFIELD.